(12) United States Patent
Speks et al.

(10) Patent No.: US 9,794,125 B2
(45) Date of Patent: Oct. 17, 2017

(54) DATA TRANSFER IN MOBILE NETWORKS

(75) Inventors: Oliver Speks, Eschweiler (DE); Kurt Essigmann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

(21) Appl. No.: 14/345,608

(22) PCT Filed: Sep. 19, 2011

(86) PCT No.: PCT/EP2011/066248
§ 371 (c)(1),
(2), (4) Date: Mar. 18, 2014

(87) PCT Pub. No.: WO2013/041122
PCT Pub. Date: Mar. 28, 2013

(65) Prior Publication Data
US 2014/0347984 A1    Nov. 27, 2014

(51) Int. Cl.
*H04L 12/24* (2006.01)
*H04W 28/16* (2009.01)
(Continued)

(52) U.S. Cl.
CPC ........ *H04L 41/0896* (2013.01); *H04L 47/824* (2013.01); *H04L 67/325* (2013.01);
(Continued)

(58) Field of Classification Search
CPC ....... H04W 4/02; H04W 4/028; H04W 64/00; H04W 40/20; H04W 72/0486;
(Continued)

(56) References Cited

U.S. PATENT DOCUMENTS

2005/0049934 A1*  3/2005  Nakayama ............. G06Q 99/00
                                                              705/500
2005/0186942 A1   8/2005  Griffin
(Continued)

FOREIGN PATENT DOCUMENTS

WO        2009151357 A1    12/2009
WO    WO 2009151357 A1 *  12/2009  ............. H04W 4/12

OTHER PUBLICATIONS

Thiagarajan, et al., "Accurate, Low-Energy Trajectory Mapping for Mobile Devices", MIT Computer Science and Artificial Intelligence Laboratory, 2011, 14 pages.

*Primary Examiner* — Marsha D. Banks Harold
*Assistant Examiner* — Elton Williams
(74) *Attorney, Agent, or Firm* — Rothwell, Figg, Ernst & Manbeck, P.C.

(57) ABSTRACT

The present invention relates to a bandwidth managing unit (200) configured to manage unidirectional data transfers of data to mobile user entities (100) in a mobile communications network (300), the bandwidth managing unit comprising:—a data transfer detecting unit configured to receive data transfer requests of the mobile user entities (100) in the mobile communications network, each data transfer request requesting a unidirectional transfer of data from a content provider,—a network condition determining unit (220) configured to determine data transfer conditions in the mobile communications network (300) for the different data transfers to the corresponding mobile user entities (100),—a data transfer scheduler (270) configured to determine, for each detected data transfer request, a point in time when the requested data transfer should be initiated, taking into account the data transfer conditions in the mobile communications network (300) for the data transfer to the corre-
(Continued)

sponding mobile user entity (100), and configured to initiate the data transfer at the determined point in time.

23 Claims, 9 Drawing Sheets

(51) Int. Cl.
*H04L 12/911* (2013.01)
*H04L 29/08* (2006.01)
*H04W 4/18* (2009.01)
*H04L 12/873* (2013.01)

(52) U.S. Cl.
CPC ............. *H04W 4/18* (2013.01); *H04W 28/16* (2013.01); *H04L 47/52* (2013.01)

(58) Field of Classification Search
CPC .......... H04W 72/1263; H04W 72/1278; H04L 1/1887; H04L 67/325; G06Q 20/102
See application file for complete search history.

(56) References Cited

U.S. PATENT DOCUMENTS

| | | | |
|---|---|---|---|
| 2005/0245243 A1 | 11/2005 | Zuniga | |
| 2008/0301262 A1 | 12/2008 | Kinoshita et al. | |
| 2009/0280829 A1* | 11/2009 | Feuerstein | ............. G01S 5/021 455/456.1 |

\* cited by examiner

DATA TRANSFER IN MOBILE NETWORKS

CROSS REFERENCE TO RELATED APPLICATION(S)

This application is a 35 U.S.C. §371 National Phase Entry Application from PCT/EP2011/066248, filed Sep. 19, 2011, designating the United States, the disclosure of which is incorporated herein in its entirety by reference.

TECHNICAL FIELD

The present invention relates to a bandwidth managing unit configured to manage unicast data transfers of data to mobile user entities in a mobile communications network and to a method therefore. The invention furthermore relates to a mobile user entity for use in the mobile communications network, a data transfer controller configured to control the unicast data transfers from a content provider to mobile user entities and to a method for controlling the unicast data transfers in the network. The invention further relates to a system including the bandwidth managing unit, the mobile user entity and the data transfer controller.

BACKGROUND

Transferable data volume over mobile radio networks will for the foreseeable future be a scarce resource. The bit rate available to the individual user depends mainly on location due to network coverage and time of the day due to behavior of other users.

Most existing solutions always start data transfer immediately and prioritize it dependent on requested/subscribed priority and type of service.

Some terminals have data management functionality implemented, that reduce the amount of data traffic over mobile networks, for example by reducing the size of transferred pictures.

The Windows operating system offers Background Intelligent Transfer Service (BITS), which monitors used data rate for IP connections and spreads data transfer over time using idle network bandwidth, considering different priority levels.

Access networks allowing high data rate often do only cover a fraction of the footprint of access networks with lower data rate. Behavior and moving pattern of the user as well as of other users is not considered.

Scheduled data transfer is not possible. Not all data, especially download of large volumes, need to be performed instantaneously but could be delayed in the range of minutes or hours.

Existing prioritization mechanisms have no fine grained weighting mechanism to optimally treat different transfer requests dependent on urgency and content type. For example, security patches of a notebook's operating system should get a higher priority compared to an application update package.

There is currently no possibility to do content based charging of data transfer to third parties in a generic way. The operator can only charge by data volume. The cost of content transfer is to a large extent unpredictable for the consumer, which gives reason to conflicts and hinders business growth.

SUMMARY

Accordingly, a need exists to be able to manage unicast data transfers to mobile user entities in such a way that data transfers can be scheduled and prioritized per user application request depending on time criticality.

This need is met by the features of the independent claims. In the dependent claims preferred embodiments are described.

According to a first aspect a bandwidth managing unit configured to manage unicast data transfers of data to mobile user entities in a mobile communications network is provided, the bandwidth managing unit comprising a data transfer detecting unit configured to receive data transfer requests of the mobile user entities in the mobile communications network, each data transfer request requesting a unicast transfer of data from a content provider. The bandwidth managing unit furthermore contains a network condition determining unit configured to determine data transfer conditions in the mobile communications network for the different data transfers to the corresponding mobile user entities. The bandwidth managing unit furthermore contains a data transfer scheduler configured to determine, for each detected data transfer request, a point in time when the requested data transfer should be initiated taking into account the data transfer conditions in the mobile communications network for the data transfer to the corresponding mobile user entity. The data transfer scheduler is furthermore configured to initiate the data transfer at the determined point in time. The bandwidth managing unit is aware of the data transfer jobs in the mobile communications network and can trigger data transfers whenever the network conditions quality for the characteristics of a particular job. This helps to avoid bottlenecks in the mobile communications network by scheduling large data transfers depending on how urgent a data transfer is. Furthermore, it allows the network operator to charge for each content transaction and makes the content transfer more transparent to the user who may pay a fixed price for the data transfer.

For initiating one of the data transfers, it is possible that the data transfer scheduler transmits a trigger signal to the mobile entity which requested said one data transfer. The transmitted trigger signal then triggers the mobile user entity to initiate the requested data transfer. In this embodiment the trigger is sent to the mobile user entity which will trigger the data transfer with the respective application that had ordered the data transfer.

In another embodiment it is possible that, for initiating one of the data transfers, the data transfer scheduler is configured to generate a unique data transfer identifier allowing unique identification of said one data transfer having a specified data volume in the mobile communications network. The data transfer scheduler is configured to transmit the unique data transfer identifier to the mobile user entity requesting said one data transfer. This unique data transfer identifier, also named token hereinafter, helps to identify a requested data transfer and helps to enable or allow the data transfer by control entities controlling data transfers in the mobile communications network. The data transfer identifier can be considered as a license allowing to identify the data transfer and allowing the data transfer to be passed through the network.

In one embodiment the identifier which is only sent to the mobile user entity can be used by the mobile user entity and sent from the mobile user entity to a data transfer controller controlling the data transfers in a mobile communications network. Based on a signature of a data transfer request sent from the mobile user entity to the data transfer controller the latter may be able to determine that the requested data transfer should be allowed. The data transfer controller may then request the data transfer from the content provider, the content being directly transmitted to the UE.

In another embodiment the data transfer scheduler may also transmit the unique data transfer identifier not only to the mobile user entity, but also directly to the data transfer controller controlling the data transfers. The data transfer controller can then compare the data transfer identifier received from the bandwidth managing unit to the data transfer identifier contained in the transferred data and included into the data by the content server which received the transfer identifier from the mobile user entity when the latter requested the data transfer from the content provider. When the two data transfer identifiers correspond to each other, the data transfer controller may allow the requested data transfer. The transfer identifier may contain the volume of the data transfer, the urgency, an expiration date until when the transfer should take place and/or a content category.

Furthermore, it is possible that the network condition determining unit, for determining the data transfer conditions for one of the data transfers, determines cell transfer capabilities of cells in which the mobile user entities are located. Furthermore, the network condition determining unit may determine the load of the cells in which the mobile user entities are located. When the cell transfer capabilities and the load of the cells are taken into account, it is possible to identify the network conditions and to schedule the data transfer when the network conditions allow a data transfer suitable for the data volume to be transmitted. When a cell of the mobile communications network in which a mobile user entity requesting a data transfer is highly loaded, the point in time when a data transfer is initiated may be postponed until the load is decreased or the user has moved to another cell. Furthermore, it is possible that the network condition determining unit takes into account the urgency of a data transfer. In this context it is possible that the urgency weights higher than a cell load when the point in time is determined when a data transfer should be initiated.

Furthermore, it is possible that the network condition determining unit, for determining the data transfer conditions for one of the data transfers, determines a cell level based geographical position of the mobile user entity requesting said one data transfer. The network condition determining unit may furthermore use a cell level based position prediction for the mobile user entity requesting said one data transfer. Some cells of a mobile communications network may have a high transfer capability, whereas other cells have a lower transfer capability. By taking into account the cell level based geographical position of a mobile user entity and by predicting how the mobile user entity will move in the cells, the network condition determining unit can predict when a requested data transfer from a mobile user entity should be initiated.

In the context of the cell level based prediction the network condition determining unit may determine the cell level based position prediction for the mobile user entity based on historical motion patterns of the mobile user entity requesting the transfer and/or of a plurality of other mobile user entities. For prediction the cell level based position map data including a road network of the geographical region in which the mobile user entity is located can be taken into account. By way of example when it is detected that a mobile entity is moving on a road which will pass a cell having a high transfer capability, the data transfer scheduler may use this information to initiate the data transfer when the mobile user entity will reach the cell with the high transfer capability.

The network condition determining unit may create a probability graph indicating when the user entity requesting said one data transfer will traverse a zone of the mobile communications network having predefined data transfer capabilities. The data transfer scheduler may then schedule the data transfer in a time window when the probability in the probability graph is higher than a predefined threshold. Here the network condition determining unit determines a hot spot prediction, hot spot meaning a cell with a high transfer capability. Whenever the computed prediction gives a high enough probability value that the mobile user entity will soon reach a geographical area where the network is provisioned with specifically high data transfer capabilities, the bandwidth managing unit will trigger the data transfer. For generating the probability graph it is possible to take into account historical motion patterns of a plurality of mobile user entities in the mobile communications network. Based on historical motion patterns of a plurality of mobile user entities the prediction of a geographical location and of a mobile user entity can be improved.

The invention furthermore relates to a method for managing the unicast data transfers of data to the mobile user entities in the mobile communications network. According to one step of the method data transfer requests of the mobile user entities in the mobile communications network are detected, each data transfer requesting a unicast transfer of data from a content provider having a specified data volume. Furthermore, the data transfer conditions in the mobile communications network are determined for the different data transfers to the corresponding mobile user entities, and for each detected data transfer request a point in time is determined when the requested data transfer should be initiated. The point in time is determined taking into account the data transfer conditions in the mobile communications network for the data transfer to the corresponding mobile user entity. Furthermore, the data transfer is initiated for each detected data transfer at the determined point in time. The method allows to schedule data transfers taking into account the transfer conditions and can thus allow a required quality of service for each transfer.

The point in time when the data transfer is initiated can be determined as discussed above taking into account cell transfer capabilities, the geographical position of the mobile user entities and/or the historical motion patterns of other mobile user entities. Furthermore, as discussed above the method may use the unique data transfer identifier for controlling the data transfer through the mobile communications network.

The invention is furthermore directed to the mobile user entity for use in a mobile communications network, the mobile user entity comprising an application requesting a unicast data transfer of data having a defined data volume to the mobile user entity via the mobile communications network. The mobile user entity furthermore comprises a data transfer managing unit configured to detect the request for the data transfer and configured to generate a data transfer request message indicating additional information regarding the unicast data transfer. A transmitter of the mobile user entity transmits the data request message to the bandwidth managing unit which manages the unicast data transfers of the mobile user entities in the mobile communications network. The data transfer managing unit in the mobile user entity provides an interface to any application in the mobile user entity that requests the unicast transfer of data from a content provider to the mobile entity. The data transfer managing unit detects data transfer requests for all applications requiring a non-instantaneous data transfer.

The data transfer managing unit may initialize the requested data transfer when it receives a trigger signal from the bandwidth managing unit of the mobile communications network. As mentioned above, the bandwidth managing unit initiates the data transfer when the network capabilities needed for the data transfer are provided. The bandwidth managing unit then triggers the mobile user entity to start the data transfer at the point in time determined by the bandwidth managing unit.

The data transfer managing unit in the mobile user entity may be configured to transmit a data request message to an application server for initializing the data transfer, the data to be transferred being provided on the application server. The data transfer managing unit may include the unique data transfer identifier allowing unique identification of the data transfer in the mobile communications network into the data request message. The unique data transfer identifier has been received from the bandwidth managing unit when the latter triggers the data transfer.

The invention is furthermore directed to the data transfer controller configured to control unicast data transfers of data from a content provider to the mobile entities in the mobile communications network, each data transfer having a specified data volume. The controller comprises a receiver configured to receive a unique data transfer identifier from a bandwidth managing unit scheduling the unicast data transfers in the network, the uniquely data transfer identifier uniquely identifying one of the unicast data transfers. Furthermore, a data transfer control unit is provided configured to allow or reject the unicast data transfers to the mobile user entities via the mobile communications network. The data transfer control unit may allow one of the unicast data transfers if the unique data transfer identifier has been received for said one data transfer. In the above-mentioned embodiment the unique data transfer identifier is received from the bandwidth managing unit. However, it may also happen that the data transfer identifier is received from the mobile user entity when the latter requests the data transfer. The data transfer controller may identify a mobile user entity that is allowed to request a data transfer by a signature of the mobile user entity, the signature identifying the requesting mobile user entity as an entity entitled to request the data transfer.

Furthermore, it is possible that the received data transfer identifier received by the data transfer controller includes for said one data transfer a time range within which said one data transfer should take place. The data transfer control unit can then only allow said one data transfer when said one data transfer takes place within the time range included in the data transfer identifier for said one data transfer. Thus, the data transfer controller is configured to only allow a data transfer in a certain time window. If the data transfer is requested before or after the allowed time window, the data transfer controller may disable the data transfer.

In another embodiment it is possible that the received data transfer identifier for said data transfer includes information about the specified data volume. The data transfer controller may then be configured to only allow the data transfer up to the specified volume. If the specified volume has been reached, the transfer may be disabled or the transfer rate may be changed, e.g. decreased.

In another embodiment the received data transfer identifier for a data transfer may include information about a predefined geographical location of the mobile user entity for which the data transfer is allowed. The data transfer control unit may then be configured to only allow the data transfer when the mobile user entity is actually located in the predefined geographical location contained in the data transfer identifier. In another embodiment it is also possible that the received data transfer identifier contains information about the transmission technology to be used for the data transfer. If the data transfer control unit then detects that the desired value technology is not available for data transfer, the transfer may be disabled. Thus, if the mobile user entity uses another access technology to the mobile communications network than suggested by the data transfer identifier, the data transfer may be disabled.

The transfer control unit of the data transfer controller might compare the data transfer identifier contained in a data transfer from the content provider to the mobile user entity to the data transfer identifier received from the bandwidth managing unit, and the data transfer control unit may only allow the data transfer if the two data transfer identifiers correspond to each other.

When the data transfer has been accomplished, it is also possible that the data transfer control unit invalidates the data transfer identifier for said one data transfer. Thus, after the predefined data volume has been completely transmitted to the mobile user entity, the data transfer identifier may lose its validity. This helps to guarantee that a single data transfer identifier is only used in connection with a single data transfer.

Furthermore, the data transfer control unit may select a tariff class for said one data transfer based on the data volume of the data transfer, the time of the data transfer, the urgency of the data transfer and/or the content category of the data transfer. The tariff class corresponds to the price the user has to pay for the requested data transfer. In this embodiment the data transfer controller is able to individually set a price for a single user and a single data transfer. Thus, the data transfer controller is configured to set a price for the requesting user individually for each data transfer and not only individually for each user.

The invention furthermore relates to a method for controlling the unicast data transfers of data from the content provider to the mobile user entities by the data transfer controller. The method contains the step of receiving a unique data transfer identifier from a bandwidth managing unit scheduling the unicast data transfers in the mobile communications network. The unique data transfer identifier identifies one of the unicast data transfers. Furthermore, the unicast data transfer to the mobile user entities via the mobile communications network may be controlled in such a way that one of the unicast data transfers is allowed if the unique data transfer identifier for said data transfer has been received. The method for controlling the unicast data transfer may be carried out as discussed above in connection with the data transfer controller. In another embodiment the unique data transfer identifier is directly received from the mobile user entity requesting the transfer.

The invention furthermore relates to a system including the above-discussed bandwidth managing unit, data transfer controller and mobile user entity.

BRIEF DESCRIPTION OF THE DRAWINGS

The invention will be described in further detail below with reference to the accompanying drawings. In these drawings.

DETAILED DESCRIPTION

Figure 1:
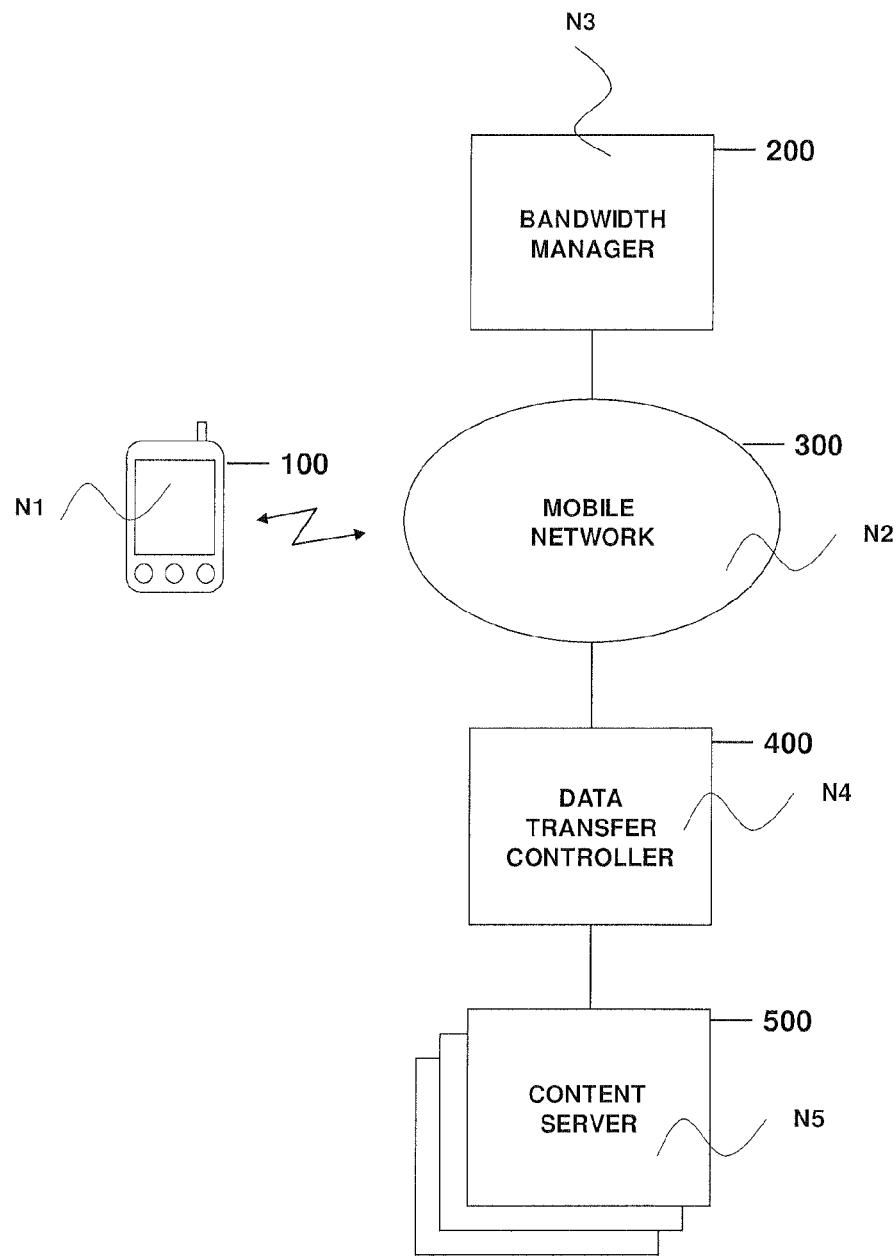
FIG. 1 shows a schematic network view of a system allowing to control the unicast data transfers.

In FIG. 1 the network view is shown with the different components involved when a mobile user entity 100 requests the transfer of data from a content server 500. A bandwidth managing unit 200 stores all data transfer jobs received from all mobile user entities 100 in a network and triggers data transfers whenever the network conditions qualify for the characteristics of a particular data transfer. The trigger is sent to the mobile user entity 100 which will trigger the data transfer with the respective application that had ordered the data transfer. The bandwidth managing unit 200, together with the trigger to start data transfer, will also generate a unique data transfer identifier or token that will be transferred to the mobile user entity 100. Furthermore, the bandwidth managing unit 200 will send the unique data transfer identifier to a data transfer controller 400. The mobile communications network through which the data of the requested transfer should be transmitted is shown by reference numeral 300. The data transfer controller 400 will store the received unique data transfer identifier and will allow or reject data transfer with the specified volume when the application uses the same data transfer identifier for the data transfer. When the specified volume is transferred, the identifier is marked as invalid and no further content transaction is possible with the identifier. The data transfer controller 400 enables and disables the data transfers that were scheduled by the bandwidth managing unit 200. The data transfer controller 400 is able to individually enable and disable single data transfers independent of the user. Thus, the data transfer controller is able not only to provide a user-specific control, but a data transfer specific control. The data transfer is a unicast, unidirectional transfer of data, a time displaced data transfer and the user normally has to pay for the requested data.

Figure 2:
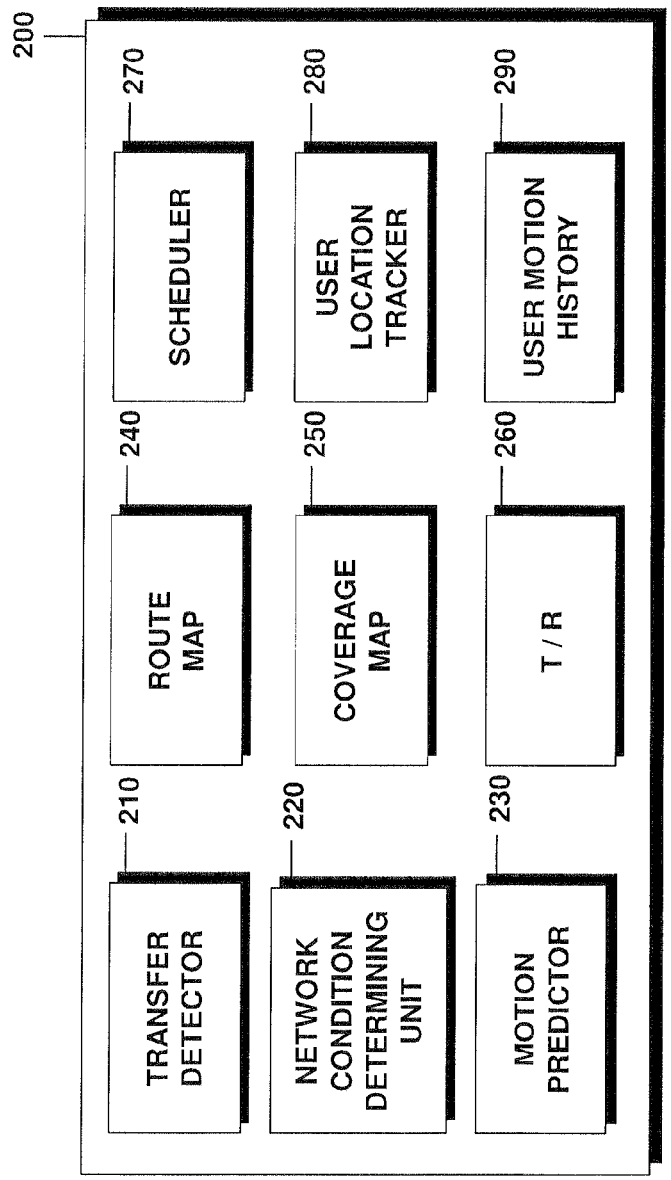
FIG. 2 shows a schematic view of the components of the bandwidth managing unit shown in FIG. 1.
Figure 3:
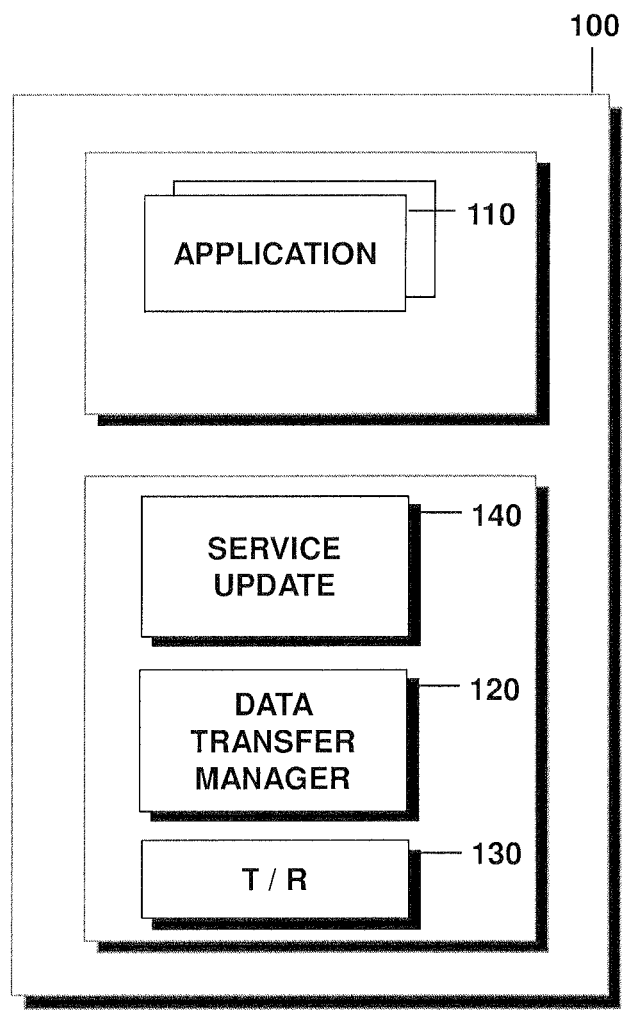
FIG. 3 shows a schematic view of the mobile user entity requesting the data transfer.

In FIGS. 2 and 3 a more detailed view of the bandwidth managing unit 200 and of the mobile user entity 100 is shown. The bandwidth managing unit 200 comprises a transfer detecting unit 210 configured to receive the transfer requests of the mobile user entities. As will be explained in further detail below, a data transfer managing unit 120 of the mobile user entity 100 issues the request to the bandwidth managing unit, the request being received via the transmitting/receiving unit 260 by the transfer detecting unit 210. A network condition determining unit 220 is configured to determine the network capabilities in the mobile communications network 300. The network condition determining unit 220 is configured to determine the cell load of the different cells of the mobile communications network and is configured to determine the cell transfer capabilities of the different cells of the mobile communications device using a coverage map 250 indicating the geographical coverage of the different cells in the mobile communications network. A data transfer scheduler 270 schedules the different data transfers requested by different mobile user entities. The data transfer scheduler determines a time window when the data transfer should be initiated. The transferred data may contain application software, patches, anti-virus-definitions, music, audio data, videos, map data etc. The data transfer relates to data provided by a content provider and for which the content provider normally charges the user for the use of the data. The data transfer is unicast from the content provider to the mobile user entity and the data transfer is not immediately initiated when the data transfer is requested, but is initiated at a point in time determined by the data transfer scheduler 270. The data transfer scheduler 270 uses information provided by the network condition determining unit 220. Additionally, the scheduler 270 may use the information of any of the following modules, a motion predictor 230 which will predict the geographical position of a mobile user entity using a road map 240 containing road network data, using a user location tracker 280 which determines the current position of a mobile user entity and using data contained in a user motion history 290 where motion patterns of different mobile user entities are stored.

The bandwidth managing unit 200 can be a separate node in the mobile communications network. However, it is also possible that the functional features symbolically represented by the different units discussed above are incorporated into another node used in a mobile communications network.

The mobile user entity 100 contains the data transfer managing unit 120 that detects data transfer requests from an application 110 in the mobile user entity. An application may be a software asking for a data update or a program requesting the download of audio or video data or an application requesting map data for a navigation system. The requested data transfers are such that the immediate transfer of the data after the data transfer request is not mandatory. The application 110 may be contained in application layer 115, the data transfer managing unit 120 and its update service 140 which is in the example shown requests the data update and therefore the data transfer are contained in an operating system layer 150. Furthermore, a transmitter receiver 130 is schematically shown allowing a communication with the mobile communications network.

Figure 8:
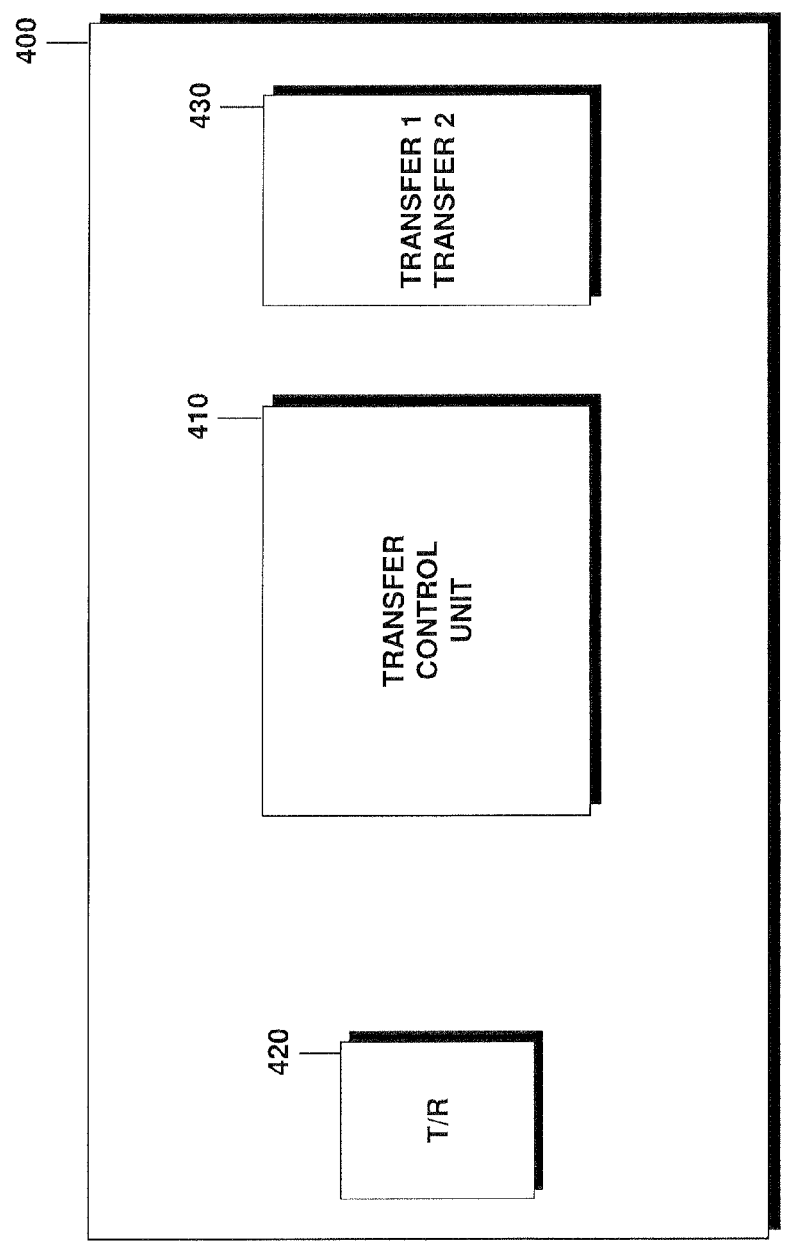
FIG. 8 shows a schematic view of the data transfer controller controlling the data transfers in the network.

In FIG. 8 the components of the data transfer controller are summarized. The data transfer controller 400 contains a transmitter/receiver 420 for communicating with the other entities, e.g. the content server, the bandwidth managing unit or the mobile user entity. The transfer control unit 410 is the unit that actually allows or rejects a data transfer based on the data transfer identifier stored in the storage unit 430 and based on the data transfer identifiers received with the data transfers.

It should be understood that the mobile user entity 100, the bandwidth managing unit 200 and the data transfer controller 400 may contain additional components. For the sake of clarity only the functional entities needed for the understanding of the present invention are shown. Furthermore, it should be understood that the functional components shown in FIGS. 2 and 3 need not to be incorporated in the indicated separation of entities. Two or more functional entities may be incorporated into one physical entity. Furthermore, it is possible that the functional entities shown in the figures are incorporated by software, by hardware or by a combination of software and hardware.

The mobile user entity 100 contains an interface to the application layer. This interface can be used by applications which are offered by content providers, to request scheduling of managed data transfers. The application 110 may furthermore specify a deadline for completion of the data transfer. The interface is provided on the data transfer managing unit 120. The data transfer managing unit 120 communicates with the bandwidth managing unit 200 and indicates the intended data transfer including the information such as the volume of the data transfer, the urgency, an expiration date for the data transfer, etc.

The bandwidth managing unit 200 stores all data transfer jobs received from all mobile data transfer managing units 120 of the different mobile entities 100 in the network and triggers data transfers whenever the network conditions qualify for the characteristics for a particular job. The scheduler 270 in the bandwidth managing unit 200 determines the point in time when the data transfer should be initiated. The scheduler transmits a trigger to the data transfer managing unit 120 which will trigger the data transfer with the respective application 110 that had ordered the data transfer.

Figure 4:
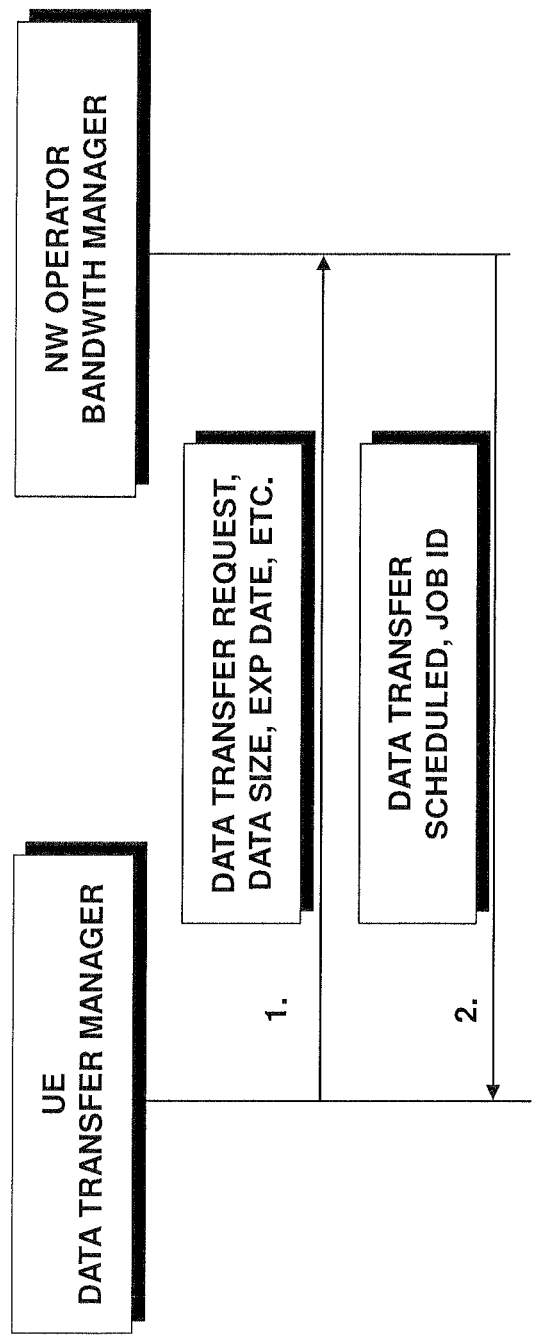
FIG. 4 shows the exchange of messages between the mobile user entity and the bandwidth managing unit.

This is shown in further detail in FIG. 4. In the first step shown in FIG. 4 the data transfer managing unit 120 of the mobile user entity 100 transmits the data transfer request to the bandwidth managing unit, the transfer detector 210 in the embodiment shown in FIG. 2. The data transfer request contains the volume of the data to be transferred, an information about urgency and possibly expiration data until which the data transfer should be accomplished. The data transfer scheduler 270 is then informed of the data transfer request and determines a point in time when the data transfer should be initiated taking into account the information provided by the network condition determining unit 220 where the conditions for the data transfers are detected. When the network conditions determined by the network condition determining unit 220 are fulfilled, the scheduler 270 in the bandwidth managing unit 200 transmits in step 2 of FIG. 4 a trigger to the data transfer managing unit 120. This trigger can contain a unique data transfer identifier allowing the unique identification of the requested data transfer. The data transfer managing unit then knows that the data transfer should be initiated.

Figure 5:
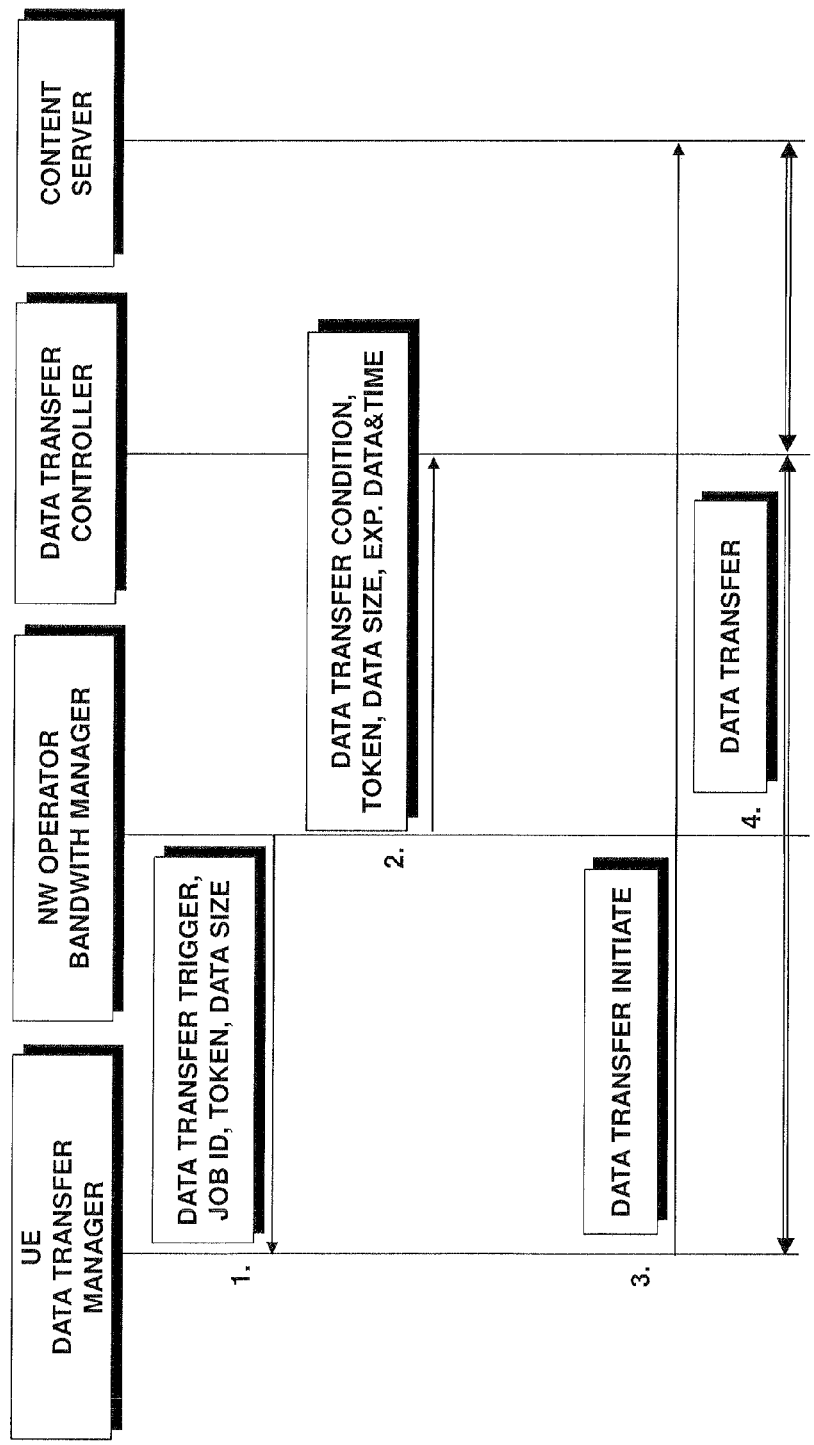
FIG. 5 shows the messages exchanged between the components before the data are actually transferred to the mobile user entity.

In connection with FIG. 5 the different steps for initiating the data transfer are explained in more detail. In step 1 of FIG. 5 the bandwidth managing unit transmits a trigger signal to the data transfer managing unit in the mobile entity. This trigger contains identification information allowing the mobile user entity to identify the data transfer to be initiated. Furthermore, the trigger contains a unique data transfer identifier/token which will help to request the transfer of the data from the content server later on. In step 2 the bandwidth managing 200 furthermore informs the data transfer controller 400 of the data transfer. The information transmitted to the data transfer controller furthermore contains the token, the data volume to be transmitted and the expected date and time. The data transfer controller which controls the actual data transfer will store the token/unique data transfer identifier and will allow or reject the data transfer with the specified volume when the application requesting the data transfer in the mobile user entity uses the same token for the data transfer.

Based on the trigger signal received from the bandwidth managing unit the data transfer managing unit initiates the data transfers by sending a request message to the content server 500 requesting the transmission of the desired content (step 3). This message contains the token that will be included in the data transferred by the content server. The content server will then transmit the desired content to the mobile user entity, the data transfer controller 400 controlling the data transfer. Only if the token transmitted from the bandwidth managing unit corresponds to the token contained in the data transfer from the content server, the data transfer controller will allow the data transfer. When the specified volume is transferred, the data transfer controller may mark the token as invalid and no further content transaction is possible with this token. The token can be further used by the data transfer controller to apply a specific charging scheme for a particular content transaction.

In another embodiment the unique data transfer identifier or token is only sent in a signed way to the mobile user entity, the data transfer identifier being included into the data transfer request to the data transfer controller. Based on the signature the data transfer controller can determine the validity of the token. In this case the data transfer controller would be the entity requesting the content from the content server. The content server would then transmit the requested data to the data transfer controller from where the data is transmitted to the mobile user entity. In this embodiment the content server would not need to be able to include the token into the data transfer necessary in the embodiment of FIG. 5 where the content server includes the token into the data transfer so that the data transfer controller can compare the token in the transmitted data to the token received from the bandwidth managing unit.

The unique data transfer identifier can limit the data transfer to a specific time range and to a specific data volume as mentioned above. Additionally, the data transfer identifier or token may also depend on the physical location of the user entity and on the radio technology used for the data transfer. If the user entity has moved to another cell or if another access technology is used as stated in the token, the data transfer may not be enabled.

Summarizing, the parameters, such as volume, time, urgency and content category are transmitted from the mobile user entity to the bandwidth managing unit (in the data transfer request). From there the parameters are transmitted to the data transfer controller (see step 2 of FIG. 5). The transfer controller then uses these parameters to select a tariff class for the data transfers. Thus, it is possible to charge the user individually for each data transfer. The costs involved can depend on the above-mentioned parameters.

In the following it is explained in more detail how the data transfer scheduler will schedule the different data transfers. The network condition determining unit 220 can determine the current cell capability using coverage map 250 containing the information about the cell capabilities of the network. Furthermore, the network condition determining unit can determine the current load in the cell. Based on the cell capabilities and the load of the cells a point in time in the future can be determined when the data transfer should be initiated. By way of example, when the cell is currently highly loaded, the trigger will be postponed until a load is decreased or until the user has moved to another cell. The scheduler will further take into account the urgency of a data transfer, e.g. the urgency would weight higher then a cell load level.

Figure 6:
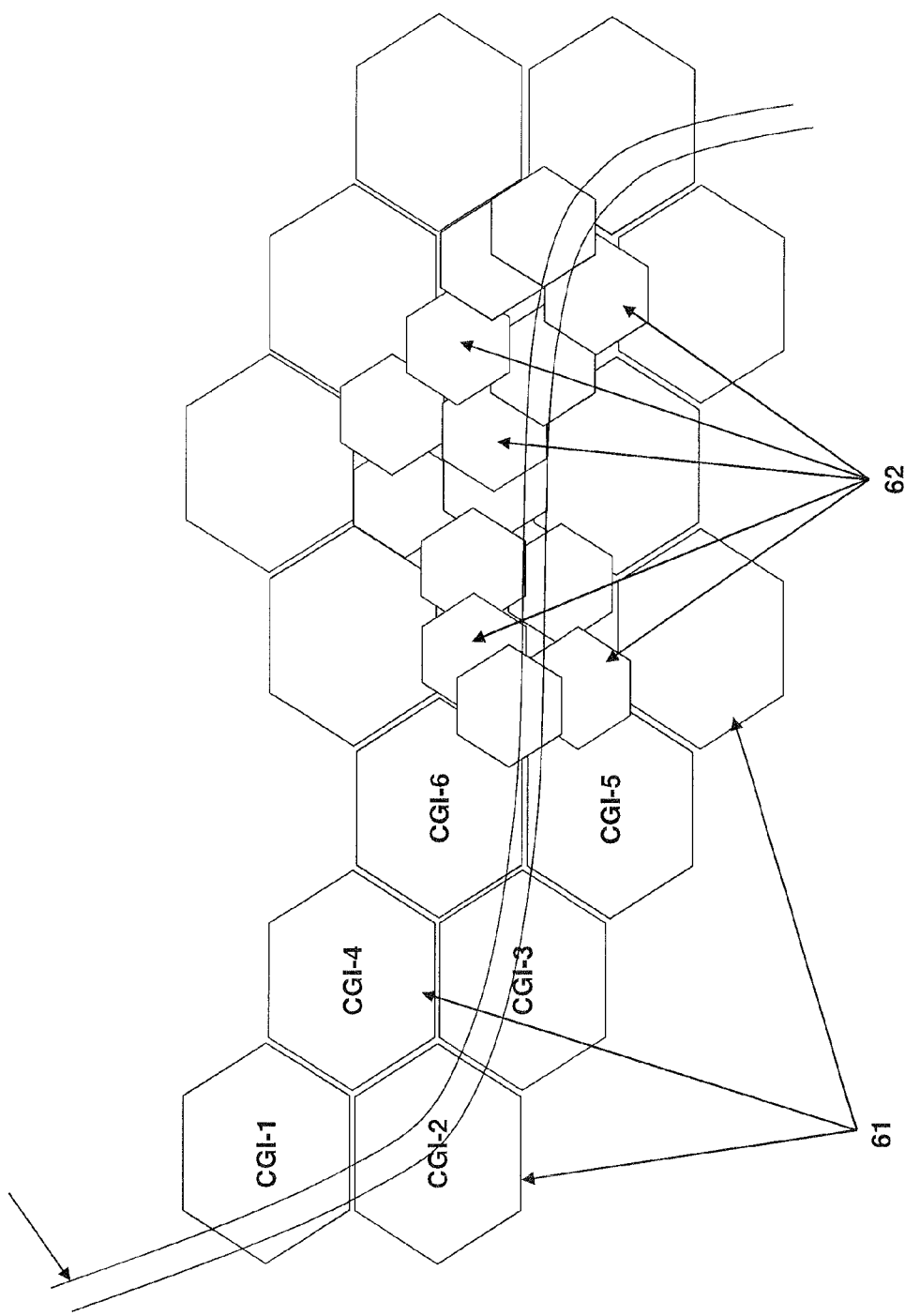
FIG. 6 shows an example of a mobility prediction, used by a bandwidth managing unit to determine a point in time when a data transfer should be initiated.

The bandwidth managing unit may furthermore track the mobile user entity's geographical position on a cell level using the user location tracker 280. As the bandwidth managing unit contains the available data transfer capabilities in the coverage map 250, the scheduler may predict when the mobile user entity will be present in a cell with a high transfer capability. To this end a motion predictor 230 is provided. The motion predictor may use information of a road network stored in a route map 240 and may use historical motion patterns stored in the user motion history 290 to predict the motion pattern of the mobile user entity. Whenever the computed prediction gives a high enough probability value that the mobile user entity will soon reach a geographical area where the network is provisioned with specifically high data transfer capabilities, the scheduler will trigger the data transfer. An example is shown in FIG. 6 where a mobile user entity moves on a road 60. Furthermore, a typical geographical cell topology of the cellular network is shown. The white cells 61 represent normal cells that offer a medium bandwidth in line with the installed transmission capacity. Furthermore, cells 62 with high transmission capacity 62 are shown.

Figure 7:
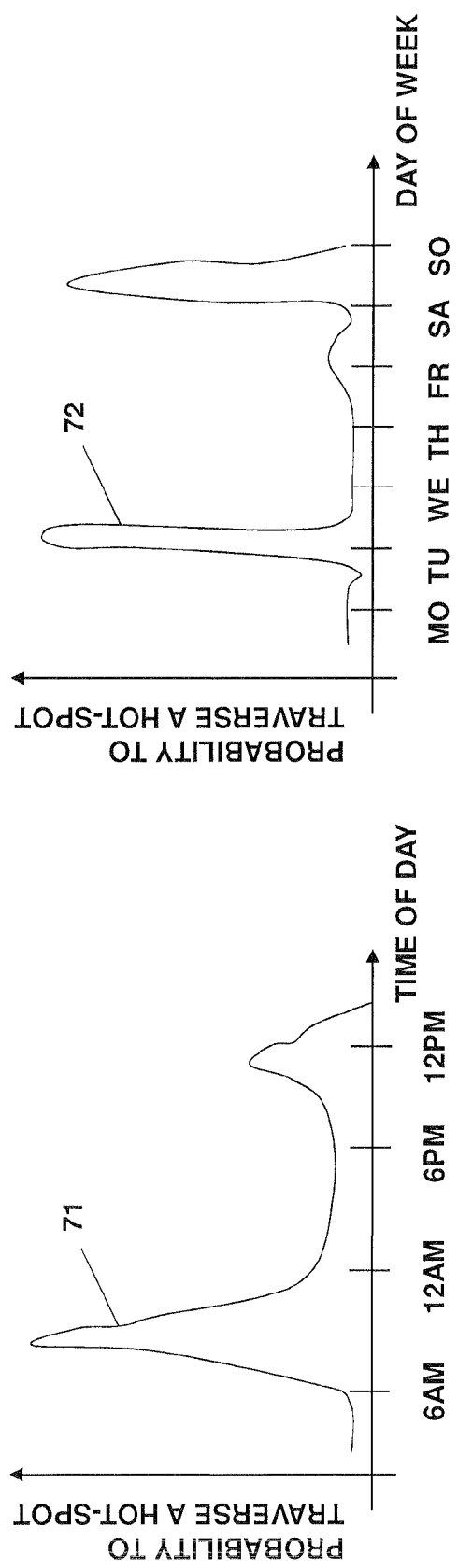
FIG. 7 shows a probability graph depending on the time of the day and the day of the week indicating probabilities for a mobile user entity to pass through a cell having a high transfer capability.

The bandwidth managing unit orders the network elements concerned with the user's mobility management and location tracking to report the used cell global identity (CGI) of the mobile user entity. Based on the reported CGI the time of the day and the day of the week the bandwidth managing unit can create a hot spot probability graph 71 and 72 as shown in FIG. 7. This hot spot probability graphs 71 and 72 indicate the probability of a mobile user entity to traverse a cell with a high transfer capability at a given time of the day and day of the week.

In this context the motion predictor 230 may also take into account historical motion patterns stored in the user motion history of other mobile user entities.

In the embodiment shown in FIG. 6, when it is detected that the mobile user entity traverses cell CGI1 followed by CGI2, the probability that the user entity will pass through the cell 62 may be around 10%. When the motion history of the user entity shows CGI1 followed by CGI2 followed by CGI3, the probability to pass through the hot spot represented by cells 62 may increase to 40%, and if it is detected that the mobile user entity also passes through CGI6, the probability may be 90%. The scheduler may use a probability threshold and as soon as the probability threshold is reached, e.g. 80%, the scheduler may schedule the data transfer to a point in time in the future when it predicts that the mobile user entity will pass through the cells 62.

Figure 9:
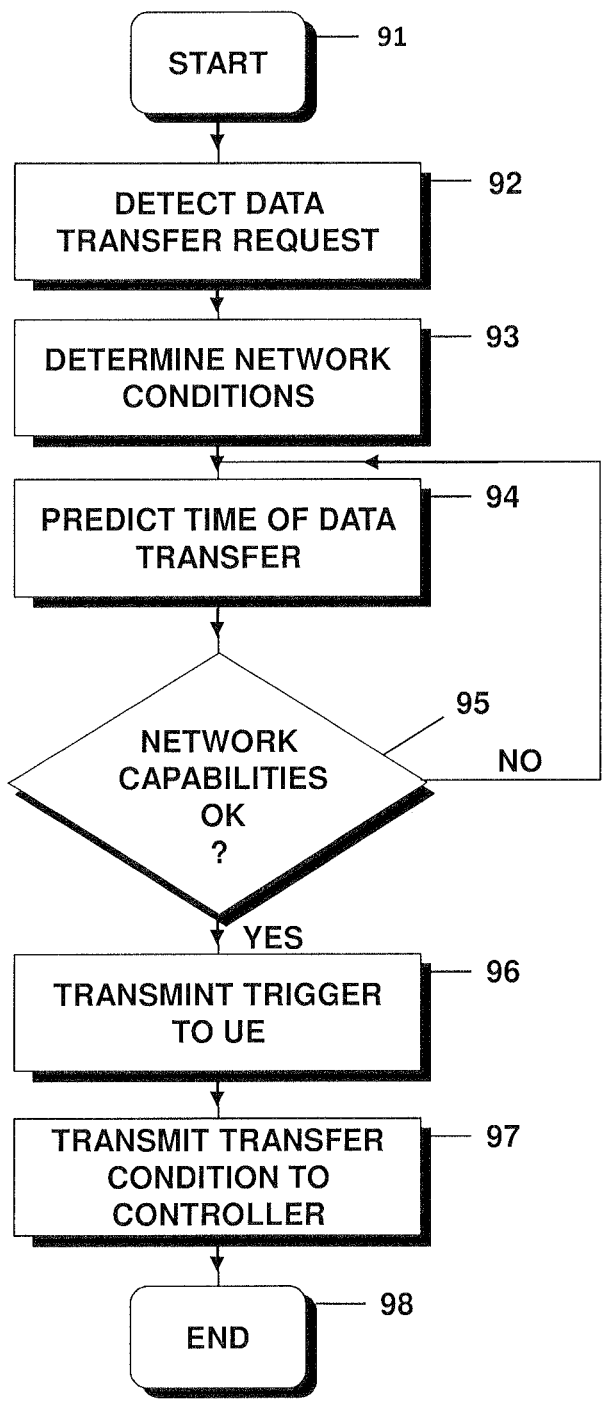
FIG. 9 shows a flowchart containing the steps how a data transfer is managed by the bandwidth managing unit.

In FIG. 9 the steps for scheduling a data transfer by the bandwidth managing unit are summarized.

The method starts in step 91 and in step 92 a data transfer request is detected by the transfer detector 210. In the next step the bandwidth managing unit determines the network conditions (step 93). In step 94 a time of the data transfer is predicted by the scheduler taking into account the network conditions and possibly taking into account other parameters explained above in connection with FIGS. 5-7. In step 95 it is then detected whether the network capabilities meet the predicted network capabilities at the predicted point in time. If this is not the case, a new prediction is carried out. If it is, however, determined in step 95 that the predicted network capabilities at the scheduled time meet the data transfer needs, the trigger signal is sent to the mobile user entity in step 96 to trigger the mobile user entity to request the data transfer. Furthermore, in step 97 the data transfer conditions including the unique data transfer identifier is also transmitted to the data transfer controller. The latter is then able to control the data transfer based on the data transfer identifier received from the mobile user entity or from the bandwidth manager. As mentioned above, step 97 may also be omitted when the mobile user entity sends the data transfer request to the data transfer controller. The method ends in step 98.

The above-described invention allows to transfer data such as software updates, security patches or anti-virus updates or images or videos at a predefined price for each data transfer, so that the pricing of the data transfer will become apparent to the user.

Furthermore, in different locations no wireline IP network is available. Subscribers therefore use mobile communications networks as a substitute. The bandwidth managing unit allows to avoid bottlenecks by scheduling and prioritizing data transfers depending on time criticality. The transfer resources can be better used. Furthermore, it is possible to control the allowed quality of service for each data transfer.

The invention claimed is:

1. A bandwidth managing unit configured to manage unidirectional data transfers of data to mobile user entities in a mobile communications network, the bandwidth managing unit comprising:

a data transfer detecting unit configured to receive data transfer requests of the mobile user entities in the mobile communications network, each data transfer request requesting a unidirectional transfer of data from a content provider;

a network condition determining unit configured to determine data transfer conditions in the mobile communications network for the different data transfers to the corresponding mobile user entities, wherein the network condition determining unit is configured to compute a probability indicating when the user entity requesting a data transfer will traverse a hot spot of the mobile communications network having data transfer capabilities that enable the data transfer to the corresponding mobile user entity taking into account the data transfer conditions in the mobile communications network, wherein the hot spot is a cell; and a data transfer scheduler configured to:

determine, for each detected data transfer request, a point in time when the requested data transfer should be initiated, taking into account the data transfer conditions in the mobile communications network for the data transfer to the corresponding mobile user entity, wherein the data transfer scheduler schedules the data transfer at the determined point in time within a defined time window when the probability is higher than a predefined threshold indicating that the corresponding mobile user entity will traverse through the hot spot at the determined point in time;

initiate the data transfer as scheduled, wherein the data transfer scheduler, for initiating one of the data transfers, is configured to:

generate a unique data transfer identifier allowing unique identification of said one data transfer having a specified data volume in the mobile communications network;

transmit the unique data transfer identifier to the mobile user entity requesting said one data transfer; and transmit the unique data transfer identifier to a data transfer controller controlling the data transfers in the mobile communications network.

2. The bandwidth managing unit according to claim 1, wherein the data transfer scheduler, for initiating one of the data transfers, transmits a trigger signal to the mobile user entity which requested said one data transfer, the transmitted trigger signal triggering the mobile user entity to initiate the requested data transfer.

3. The bandwidth managing unit according to claim 1, wherein the network condition determining unit, for determining the data transfer conditions for one of the data transfers, is configured to determine cell transfer capabilities of cells in which the mobile user entities are located and configured to determine the load of the cells.

4. The bandwidth managing unit according to claim 1, wherein the network condition determining unit, for determining the data transfer conditions for one of the data transfers, is configured to determine a cell level based geographical position of the mobile user entity requesting said one data transfer and configured to determine a cell level based position prediction for the mobile user entity requesting said one data transfer.

5. The bandwidth managing unit according to claim 4, wherein the network condition determining unit determines the cell level based position prediction for the mobile user entity based on one or more of historical motion patterns of the mobile user entity and map data including a road network of the geographical region in which the mobile user entity is located.

6. The bandwidth managing unit according to claim 4, wherein the network condition determining unit is configured to create the probability graph, taking into account historical motion patterns from a plurality of mobile user entities in the mobile communications network.

7. A method for managing unidirectional data transfers of data to mobile user entities in a mobile communications network, the method comprising the steps of:
 detecting data transfer requests of the mobile user entities in the mobile communications network, each data transfer request requesting a unidirectional transfer of application data from a content provider having a specified data volume;
 determining data transfer conditions in the mobile communications network for the different data transfers to the corresponding mobile user entities;
 determining, for each detected data transfer request, a point in time when the requested data transfer should be initiated, taking into account the data transfer conditions in the mobile communications network for the data transfer to the corresponding mobile user entity, wherein the determined point in time is within a defined time window when a probability computed by a network condition determining unit is higher than a predefined threshold indicating when the mobile user entities requesting a data transfer will traverse a hot spot of the mobile communications network having data transfer capabilities that enable the data transfer to the corresponding mobile user entity taking into account the data transfer conditions in the mobile communications network, wherein the hot spot is a cell; and
 initiating, for each detected data transfer request, the data transfer at the determined point in time, wherein, for initiating one of the data transfers, a unique data transfer identifier is generated allowing unique identification of said one data transfer in the mobile communications network, the unique data transfer identifier being transmitted by a bandwidth managing unit to the mobile user entity requesting said one data transfer and to a data transfer controller controlling the data transfers in the mobile communications network.

8. The method for managing unidirectional data transfers according to claim 7, wherein, for determining the data transfer conditions for one of the data transfers, a cell transfer capability of a cell in which the mobile user entity requesting said one data transfer is located, and the load of the cell is determined.

9. The method for managing unidirectional data transfers according to claim 7, wherein, for determining the data transfer conditions for one of the data transfers, a cell level based geographical position of the mobile user entity requesting said one data transfer is determined and a cell level based position is predicted for the mobile user entity requesting said one data transfer.

10. The method for managing unidirectional data transfers according to claim 9, wherein the cell level based position is predicted based on one or more of historical motion patterns of mobile user entities and map data including a road network of the geographical region in which the mobile user entities are located.

11. A mobile user entity for use in a mobile communications network comprising:
 an application requesting a unidirectional data transfer of data from a content provider having a defined data volume to the mobile user entity via the mobile communications network;
 a data transfer managing unit configured to detect the request for the data transfer and configured to generate a data transfer request message including additional information regarding the unicast data transfer; and
 a transmitter configured to transmit the data request message to a bandwidth managing unit managing the unidirectional data transfers to mobile user entities in the mobile communications network, wherein the unidirectional data transfers to mobile user entities are scheduled at a point in time within a defined time window when a probability computed by a network condition determining unit is higher than a predefined threshold indicating when the mobile user entities requesting a data transfer will traverse a hot spot of the mobile communications network having data transfer capabilities that enable the data transfer to the corresponding mobile user entity taking into account the data transfer conditions in the mobile communications network, wherein the hot spot is a cell, and wherein the data transfer managing unit is configured to initialise the requested data transfer when it receives a trigger signal from the bandwidth managing unit of the mobile communications network, wherein the data transfer managing unit, for initialising the data transfer, is configured to transmit a data request message to an application server where the data to be transferred are stored, and to include a unique data transfer identifier allowing unique identification of said data transfer in the mobile communications network into the data request message, the unique data transfer identifier being received from the bandwidth managing unit.

12. A data transfer controller configured to control unidirectional data transfers of data from a content provider to mobile user entities in a mobile communications network, each data transfer having a specified data volume being scheduled at a point in time within a defined time window when a probability computed by a network condition determining unit is higher than a predefined threshold indicating when the mobile user entities requesting a data transfer will traverse a hot spot of the mobile communications network having data transfer capabilities that enable the data transfer to the corresponding mobile user entity taking into account the data transfer conditions in the mobile communications network, wherein the hot spot is a cell, the controller comprising:
 a receiver configured to receive a unique data transfer identifier from a bandwidth managing unit the unidirectional data transfers in the mobile communications network, the unique data transfer identifier uniquely identifying one of the unidirectional data transfers;

a data transfer control unit configured to allow or reject the unidirectional data transfers to the mobile user entities via the mobile communications network, wherein the data transfer control unit allows one of the unidirectional data transfers if the unique data transfer identifier has been received for said one data transfer, wherein the data transfer control unit is configured to compare the data transfer identifier, contained in said one data transfer from the content provider to the mobile user entity, to the data transfer identifier received from the bandwidth managing unit, and is configured to only allow said one data transfer if the two data transfer identifiers correspond to each other.

13. The data transfer controller according to claim 12, wherein the received data transfer identifier for said one data transfer includes a time range within which said one data transfer should take place, wherein the data transfer control unit is configured to only allow said one data transfer when said one data transfer takes place within the time range included in the data transfer identifier for said one data transfer.

14. The data transfer controller according to claim 12, wherein the received data transfer identifier for said one data transfer includes information about the specified data volume, wherein the data transfer control unit is configured to only allow said one data transfer up to the specified data volume.

15. The data transfer controller according to claim 12, wherein the received data transfer identifier for said one data transfer includes information about a predefined geographical location of the mobile user entity for which said one data transfer is allowed, wherein the data transfer control unit is configured to only allow said one data transfer when the mobile user entity is located in the predefined geographical position.

16. The data transfer controller according to claim 12, wherein the data transfer control unit is configured to invalidate the data transfer identifier for said one data transfer when said one data transfer has been accomplished.

17. The data transfer controller according to claim 12, wherein the data transfer control unit is configured to select a tariff class for said one data transfer based on at least one of the following parameters: data volume of said one data transfer, time of said one data transfer, urgency of said one data transfer, content category of said one data transfer.

18. A method for controlling, by a data transfer controller, unidirectional data transfers of data from a content provider to mobile user entities in a mobile communications network, each data transfer having a specified data volume and being scheduled at a point in time within a defined time window when a probability computed by a network condition determining unit is higher than a predefined threshold indicating when the mobile user entities requesting a data transfer will traverse a hot spot of the mobile communications network having data transfer capabilities that enable the data transfer to the corresponding mobile user entity taking into account the data transfer conditions in the mobile communications network, wherein the hot spot is a cell, the method comprising the steps of:

receiving a unique data transfer identifier from a bandwidth managing unit scheduling the unidirectional data transfers in the mobile communications network, the unique data transfer identifier uniquely identifying one of the unidirectional data transfers;

controlling the unidirectional data transfers to the mobile user entities via the mobile communications network in such a way that one of the unidirectional data transfers is allowed if the unique data transfer identifier has been received for said one data transfer; and comparing the data transfer identifier, contained in said one data transfer from the content provider to the mobile user entity, to the data transfer identifier received from the bandwidth managing unit, wherein said one data transfer is only allowed if the two data transfer identifiers correspond to each other.

19. A method for controlling unidirectional data transfers of application data according to claim 18, wherein the received data transfer identifier for said one data transfer includes a time range within which said one data transfer should take place, wherein said one data transfer is only allowed when said one data transfer takes place within the time range included with the data transfer identifier for said one data transfer.

20. The method for controlling unidirectional data transfers of application data according to claim 18, wherein the received data transfer identifier for said one data transfer includes information about the specified data volume, wherein said one data transfer is only allowed transfer up to the specified data volume.

21. A system configured to control unicast data transfers of data to a mobile user entity in a mobile communications network, the system comprising a bandwidth managing unit comprising:

a data transfer detecting unit configured to receive data transfer requests of the mobile user entities in the mobile communications network, each data transfer request requesting a unidirectional transfer of data from a content provider;

a network condition determining unit configured to determine data transfer conditions in the mobile communications network for the different data transfers to the corresponding mobile user entities, wherein the network condition determining unit is configured to compute a probability indicating when the user entity requesting a data transfer will traverse a hot spot of the mobile communications network having data transfer capabilities that enable the data transfer to the corresponding mobile user entity taking into account the data transfer conditions in the mobile communications network, wherein the hot spot is a cell; and a data transfer scheduler configured to:

determine, for each detected data transfer request, a point in time when the requested data transfer should be initiated, taking into account the data transfer conditions in the mobile communications network for the data transfer to the corresponding mobile user entity, wherein the data transfer scheduler schedules the data transfer at the determined point in time within a defined time window when the probability is higher than a predefined threshold indicating that the corresponding mobile user entity will traverse through the hot spot at the determined point in time;

initiate the data transfer as scheduled, wherein the data transfer scheduler, for initiating one of the data transfers, is configured to:

generate a unique data transfer identifier allowing unique identification of said one data transfer having a specified data volume in the mobile communications network;

transmit the unique data transfer identifier to the mobile user entity requesting said one data transfer; and transmit the unique data transfer identifier to a data transfer controller controlling the data transfers in the mobile communications network;

a mobile user entity comprising:

an application requesting a unidirectional data transfer of data from a content provider having a defined data volume to the mobile user entity via the mobile communications network;

a data transfer managing unit configured to detect the request for the data transfer and configured to generate a data transfer request message including additional information regarding the unicast data transfer; and a transmitter configured to transmit the data request message to a bandwidth managing unit managing the unidirectional data transfers to mobile user entities in the mobile communications network wherein the data transfer managing unit is configured to initialise the requested data transfer when it receives a trigger signal from the bandwidth managing unit of the mobile communications network, wherein the data transfer managing unit, for initialising the data transfer, is configured to transmit a data request message to an application server where the data to be transferred are stored, and to include a unique data transfer identifier allowing unique identification of said data transfer in the mobile communications network into the data request message, the unique data transfer identifier being received from the bandwidth managing unit; and a data transfer controller comprising:

a receiver configured to receive a unique data transfer identifier from a bandwidth managing unit scheduling the unidirectional data transfers in the mobile communications network, the unique data transfer identifier uniquely identifying one of the unidirectional data transfers; and a data transfer control unit configured to allow or reject the unidirectional data transfers to the mobile user entities via the mobile communications network, wherein the data transfer control unit allows one of the unidirectional data transfers if the unique data transfer identifier has been received for said one data transfer, wherein the data transfer control unit is configured to compare the data transfer identifier, contained in said one data transfer from the content provider to the mobile user entity, to the data transfer identifier received from the bandwidth managing unit, and is configured to only allow said one data transfer if the two data transfer identifiers correspond to each other.

22. The bandwidth managing unit according to claim 1, wherein the network condition determining unit is configured to determine the cell transfer capabilities of the different cells of the mobile communications device using a coverage map indicating the geographical coverage of the different cells in the mobile communications network.

23. The bandwidth managing unit according to claim 1, wherein the data transfer scheduler schedules the data transfer at the determined point in time in future within a defined time window based on the probability of the corresponding mobile user entity traversing through the hot spot at the determined point in time, the load of the cell, and urgency of data transfer.

* * * * *